US006795741B2

(12) United States Patent
Simon

(10) Patent No.: US 6,795,741 B2
(45) Date of Patent: Sep. 21, 2004

(54) RADIO COMMUNICATION SYSTEM AND METHOD

(75) Inventor: Anthony Luke Simon, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 598 days.

(21) Appl. No.: 09/829,602

(22) Filed: Apr. 11, 2001

(65) Prior Publication Data

US 2002/0151272 A1 Oct. 17, 2002

(51) Int. Cl.[7] .................................... G06F 17/00
(52) U.S. Cl. ..................... 700/94; 455/3.01; 455/3.06
(58) Field of Search ........................ 455/3.02, 3.06, 455/45, 186.1, 3.01, 179.1, 227, 345; 709/217, 218

(56) References Cited

U.S. PATENT DOCUMENTS 4,953,219 A * 8/1990 Kasai et al. .................. 381/86
6,163,683 A 12/2000 Dunn et al. .............. 455/151.1
6,181,996 B1 * 1/2001 Chou et al. .................. 701/36
6,622,007 B2 * 9/2003 Linden ...................... 455/12.1
2002/0095228 A1 * 7/2002 Corts et al. .................. 700/94

OTHER PUBLICATIONS

"How digital radio works", Copyright 2000 iBiquity Digital Corporation, three page web–site article.

* cited by examiner

*Primary Examiner*—Nay Maung
*Assistant Examiner*—Raymond S Dean
(74) *Attorney, Agent, or Firm*—Anthony Luke Simon

(57) ABSTRACT

A radio communications method comprising the steps of: selecting a first content; selecting a second content; simultaneously broadcasting digital information representing the first and second contents over a single broadcast channel; receiving in a vehicle the broadcast of digital information representing the first and second contents, receiving a sensor signal indicating a number of occupants in the vehicle; selecting one of the first and second contents in response to the sensor signal; and playing the selected content over an audio system in the vehicle.

7 Claims, 2 Drawing Sheets

RADIO COMMUNICATION SYSTEM AND METHOD

TECHNICAL FIELD

This invention relates to a system and method for radio communication to vehicles.

BACKGROUND OF THE INVENTION

It is known in the broadcast industry to provide broadcast programs over public airways, through proprietary cable systems, over computer networks such as the Internet, and through satellite broadcast.

It is known for the in-home entertainment industry to provide devices that allow the selection and recording of a regularly broadcast program for play back at a later time. This accommodates users that cannot watch the program during broadcast and users that desire to take breaks during viewing of a program without missing parts of the program.

It is known for the in-home computer industry to provide software that plays audio files on demand. Users can create audio file libraries by downloading files on the internet or by uploading files off of recorded media, such as compact discs. When downloading over the internet, the user visits a web site, selects one or more titles, and causes a downloading directed to the user's computer.

Digital radio technology has been developed for operation over AM and FM carrier frequencies. Digital radio technology allow broadcast of digital signals, analog signals, or both digital and analog signals. Digital radio technology allows increased data content in a given station bandwidth compared to conventional AM and FM technologies. This data content may be in the form of high quality digital audio broadcast and/or non-audio digital data. Example digital radio technology is Ibiquity HD Radio.

SUMMARY OF THE INVENTION

Advantageously, this invention provides a radio communication system and method.

Advantageously, this invention provides a radio communication system and method particularly suitable for use with motor vehicles. Advantageously, this invention provides a radio communication system and method that utilizes the increased information capacity of digital radio technology to allow a form of targeted radio advertising to vehicle passengers. More particularly, an advantage of this invention is the use of the digital radio data bandwidth to broadcast multiple content on a single station (for example, AM or FM) and having the radio receiver select the desired broadcast based upon criteria at the receiver. In a preferred example, the radio station broadcasts simultaneously two (or more) commercials, one targeting vehicles with one passenger and another targeting vehicles with multiple passengers. The vehicle radio communicates with other vehicle systems or sensors to determine the number of occupants in the vehicle. The radio then selects one of the two simultaneous commercials to allow target advertising by playing one of the commercials if the vehicle has a single occupant and by playing the other of the commercials if the vehicle has multiple occupants.

Advantageously then, according to a preferred example, this invention provides a radio communications method comprising the steps of: selecting a first content, selecting a second content, substantially simultaneously broadcasting digital information representing the first and second contents, receiving in a vehicle the broadcast of digital information representing the first and second contents, receiving a sensor signal indicating a number of passengers in the vehicle, selecting one of the first and second contents in response to the sensor signal, and playing the selected content over an audio system in the vehicle.

Advantageously then, according to a preferred example, this invention provides a radio apparatus comprising: a radio for receiving digital broadcasts containing two or more contents substantially simultaneously broadcast over a single broadcast channel; one or more sensors for detecting a status of the vehicle, a selection function for selecting one of the contents; and an audio output for playing the selected content.

BRIEF DESCRIPTION OF THE DRAWINGS

The present invention will now be described by way of example with reference to the following drawings, in which.

DESCRIPTION OF THE PREFERRED EMBODIMENT

Figure 1:
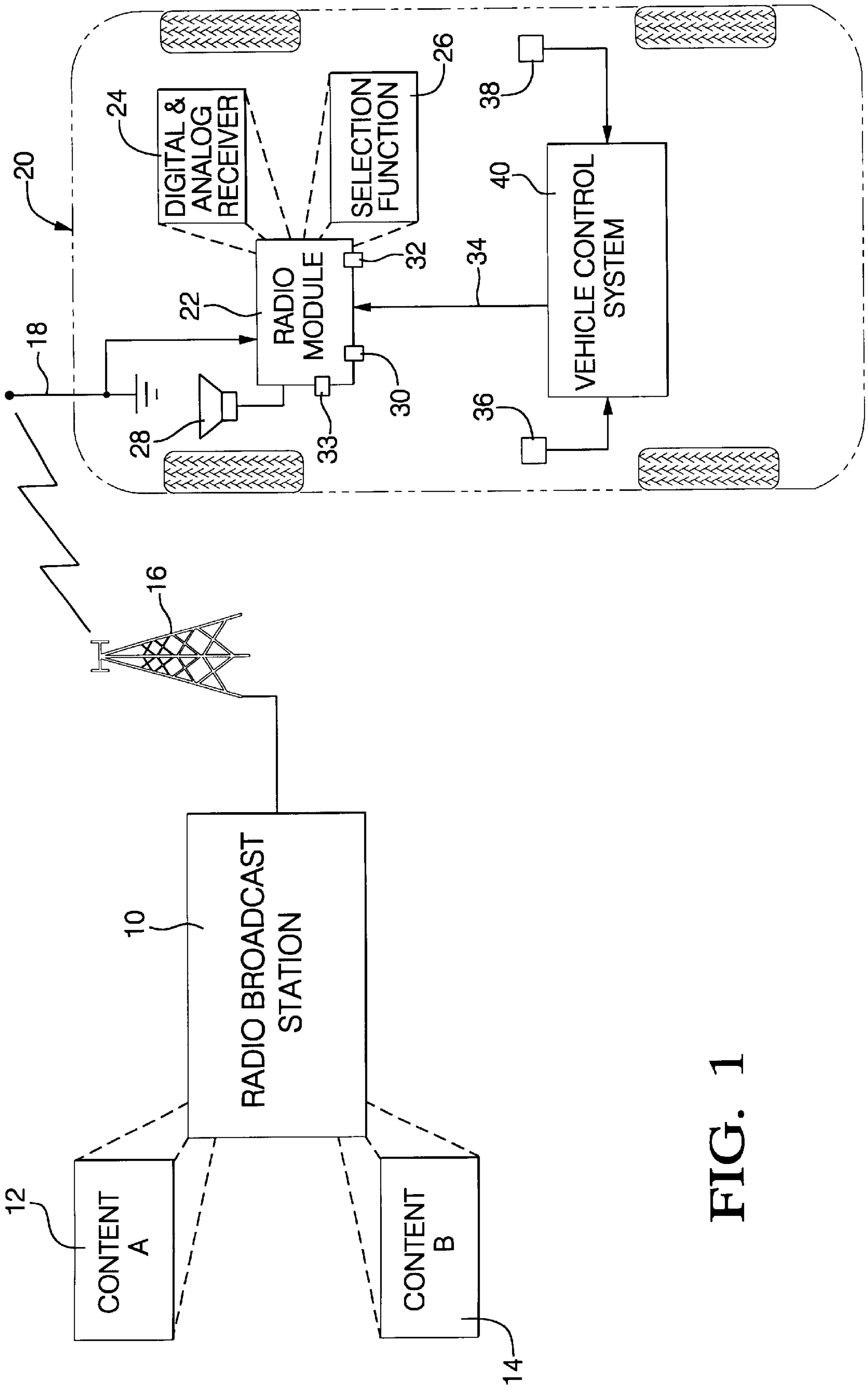
FIG. 1 illustrates an example system for implementing this invention.

FIG. 1 illustrates an example system according to this invention including a broadcast station 10, and vehicle 20 with radio module 22 for receiving and playing radio broadcasts through the vehicle audio output system represented by speaker 28. The broadcast station 10 broadcasts via antenna 16 content such as news, talk and/or music as its main programming selection using digital radio broadcast techniques or techniques that combine digital and analogue broadcast (for example, so the broadcast can be received by conventional radios and by digital radios). The broadcast station also has separate contents A and B 12, 14 for simultaneous broadcast as compressed and/or encrypted digital data. In this example, the separate contents A and B 12, 14 represent commercials inserted into the main programming selection as is conventionally known except that contents A and B 12, 14 are broadcast substantially simultaneously and can be decompressed/decrypted by the vehicle radio module 22. Techniques for encrypting and/or compressing two separate signals for substantially simultaneous broadcast and selective decompression/decryption at the receiver are well known to those skilled in the art and need not be set forth in detail herein.

The motor vehicle 20 includes a radio module 22 adapted to receive digital radio broadcasts and standard audio system components represented schematically by speaker 28. The vehicle also includes one or more sensors such as, for example, seat sensors 36, 38, optical sensors 30, 32, or switch 33 to sense whether the vehicle has one, or more than one occupant. Example seat sensors 36, 38 are seat sensors of a known type that detect when an occupant is sitting in a vehicle seat. Example optical sensors 30, 32 are infrared or other optical sensors built into the radio module 22 or separate therefrom that optically detect whether there is more than one occupant in the vehicle. Switch 33 is a manual input switch to allow the vehicle operator to select whether the radio should operate in single occupant mode or multiple occupant mode. These are example sensors for sensing the number of occupants in the vehicle, many other types of sensors are known to those skilled in the art and are equally suitable for use with this system.

In the example shown, sensors 33, 30 and 32 provide direct input to the radio module 22, while sensors 36 and 38 communicate directly with a separate control system 40. The outputs of sensors 36 and 38 are communicated to the radio module 22 through line 34, which, for example, represents a vehicle data bus. Thus it is seen that the sensor inputs to the radio module may be either direct or indirect through another vehicle system.

The vehicle antenna 18 captures broadcast radio signals and provides them to the radio module 22. The radio module 22 preferably is capable of receiving and playing for the vehicle occupants conventional analog radio signals and digital radio signals as represented by the digital receiver function block 24.

When the radio module 22 is tuned (i.e., the correct station is selected) to receive signals broadcast from the radio broadcast station 10, the radio module receives and decodes the digital programming to play for the occupants the transmitted program content, such as, for example, news, other forms of talk show, or music.

When the radio station substantially simultaneously broadcasts two or more contents, for example, using techniques such as multiplexing, interleaving, or splitting the channel into sub-channels, the broadcast digital data may contain header information that the receiver uses to identify the occurrence of a substantially simultaneous broadcast. When the header is received, the radio module 22 will recognize it and activates the necessary functions for receiving and decoding the simultaneous broadcast.

When the radio module 22 receives a signal that consists of two or more contents substantially simultaneously broadcast, the selection function 26 is activated. The selection function 26 responds to the sensor input to select for playing the content that targets the number of vehicle occupants. In a preferred example, if there is one occupant in the vehicle, then content A (reference 12) is selected, decoded (e.g., decompressed and/or decrypted) and played over the vehicle audio system. And if two or more occupants are in the vehicle, then content B (reference 14) is selected, decoded (e.g., decompressed and/or decrypted) and played over the vehicle audio system. In an alternative embodiment, both contents A and B are decoded, and only the selected content is played over the audio system. It is not necessary for the broadcast to employ compression or encryption, but these techniques may increase data rate capability per channel.

Figure 2:
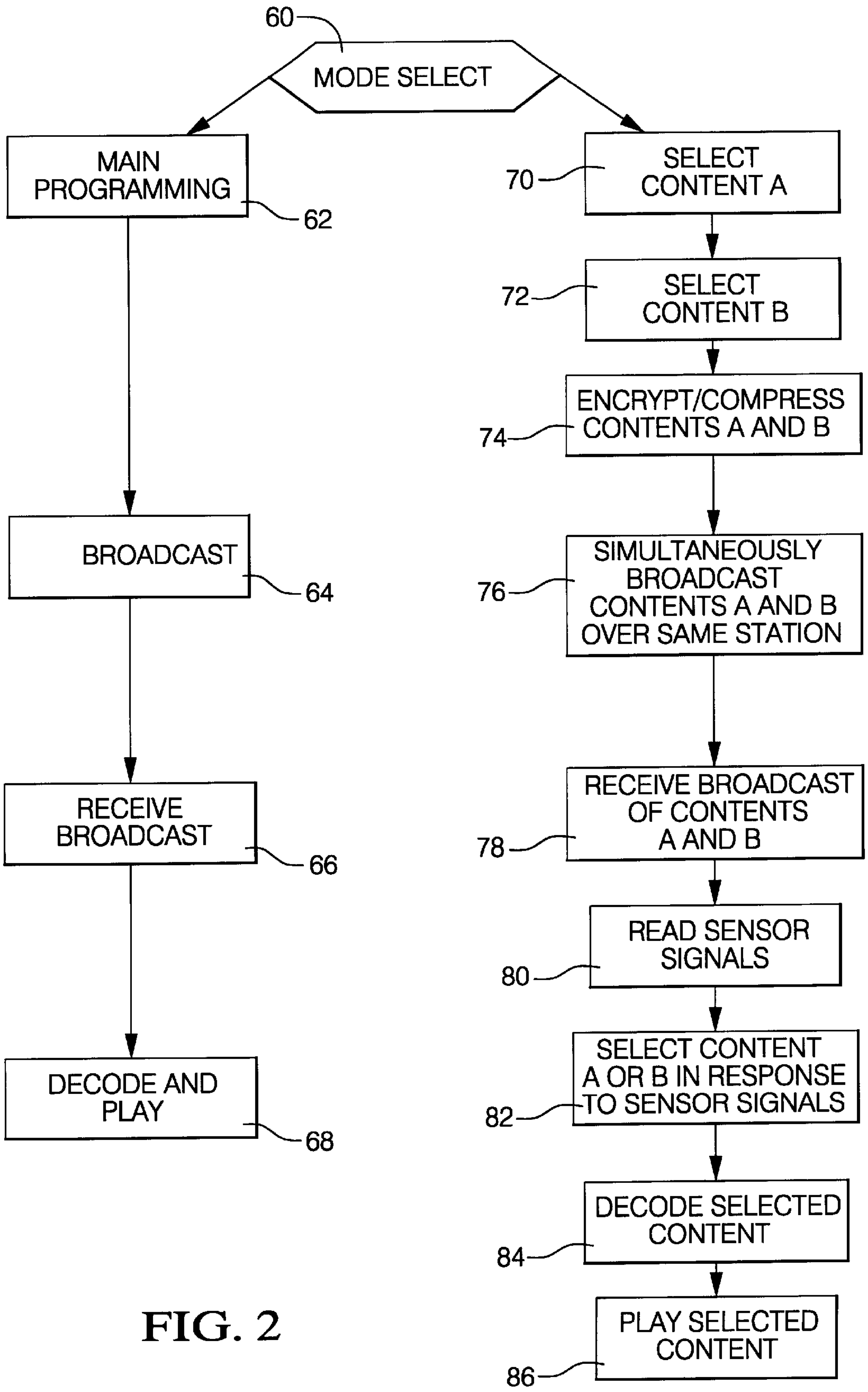
FIG. 2 illustrates example method steps for implementing this invention.

Referring now to FIG. 2, an example of steps performed by the system described in FIG. 1 is illustrated. Block 60 represents selecting at the broadcast station between a first mode—standard digital radio programming consisting of one signal (digital or digital and analog) to be decoded as audio content—and a second mode—simultaneously broadcasting first and second content where one is selected and played as the audio content by the radio receiver.

The first mode is represented by blocks 62, 64, 66 and 68. Block 62 represents conventional programming by the radio station. Block 64 represents digital broadcast of the conventional programming. Block 66 represents the radio module receiving the digitally broadcast programming and block 68 represents the standard decoding and playing functions of the digital radio module.

The second mode is represented by blocks 70, 72, 74, 76, 78, 80, 82 and 84. The second mode is selected, for example, when it is time for the broadcast station to insert a commercial into the broadcast, and the commercial designated according to the station's criteria is represented by a commercial that can be (a) tailored separately for single passenger and multiple passenger vehicles, in which case the commercial has two forms represented by content A and content B or (b) a commercial that is suitable for only one of single and multiple passenger vehicles, in which case the commercial is designated as content A and a separate commercial is designated as content B. Blocks 70 and 72 represent the selection of the contents A and B to be substantially simultaneously broadcast as digital audio data.

Block 74 represents the encryption and or compression of the contents A and B into digital data for simulcast broadcasting. It is understood that the encryption and or compression may take place beforehand and the contents A and B can be stored as encrypted and/or compressed data at the broadcast station.

Block 76 represents the step of substantially simultaneously broadcasting contents A and B over the same AM or FM radio station using digital broadcast techniques for substantially simultaneously broadcasting multiple contents over the same channel. Because both digital broadcast and simultaneous broadcast technologies are known to those skilled in the art, no detailed description thereof need be set forth herein.

Blocks 78 through 84 are performed by the radio module starting with step 78 where the radio module receives the digitally broadcast contents A and B. At block 80 the radio module reads the sensor signal from one or more of the sensors determining the status of the vehicle, for example, whether it is occupied by one person or more than one person. At block 82, the radio module selects the content A or B in response to the sensor signals. For example, in one implementation, if the sensors indicate that one person occupies the vehicle, then block 82 selects content A comprising a commercial directed towards single occupant vehicles and, if the sensors indicate that two or more persons occupy the vehicle, then block 82 selects content B comprising a commercial directed towards vehicles with multiple occupants.

Block 84 represents the step of decoding the selected content and block 86 represents the step of playing over the vehicle audio system the selected content. As mentioned above, the decoding may occur for both contents A and B, even though only one is played.

In the above example, content is selected based upon sensor input indicating the number of passengers in the vehicle. In other examples, different sensors on the vehicle can be used as inputs to select content to allow target messages based on the status of the vehicle as indicated by the sensor output signals.

What is claimed is:

1. A radio communications method comprising the steps of:

selecting a first content;

selecting a second content;

substantially simultaneously broadcasting digital information representing the first and second contents over a single broadcast channel;

receiving in a vehicle the broadcast of digital information representing the first and second contents;

receiving a sensor signal indicating a number of occupants in the vehicle;

selecting one of the first and second contents in response to the sensor signal; and playing the selected content over an audio system in the vehicle.

2. The method of claim 1, wherein the single broadcast channel is an AM channel.

3. The method of claim 1, wherein the single broadcast channel is an FM channel.

4. The method of claim 1, wherein the selected content is an advertisement targeted for the number of occupants of the vehicle.

5. A radio apparatus comprising:

a receiver for receiving digital broadcasts containing at least two contents substantially simultaneously broadcast over a single broadcast channel;

at least one sensor for detecting a status of a vehicle;

a selection function for selecting one of the contents in response to the at least one sensor; and an audio output for playing the selected content.

6. A radio apparatus according to claim 5, wherein the at least one sensor detects a number of occupants of the vehicle.

7. A radio communications method comprising the steps of:

selecting a first content;

selecting a second content;

substantially simultaneously broadcasting digital information representing the first and second contents over a single broadcast channel;

receiving in a vehicle the broadcast of digital information representing the first and second contents;

receiving a sensor signal indicating a status of the vehicle;

selecting one of the first and second contents in response to the sensor signal; and playing the selected content over an audio system in the vehicle.

* * * * *